Dec. 11, 1934.  G. B. GALLASCH  1,984,127

MICROSCOPE

Filed April 13, 1933

GEORGE B. GALLASCH
INVENTOR

BY *J. A. Ellestad*
ATTORNEY

Patented Dec. 11, 1934

1,984,127

UNITED STATES PATENT OFFICE 1,984,127

MICROSCOPE

George B. Gallasch, Rochester, N. Y., assignor to Bausch & Lomb Optical Company, Rochester, N. Y., a corporation of New York Application April 13, 1933, Serial No. 665,974

10 Claims. (Cl. 88—39)

This invention relates to microscopes and more particularly it has reference to the means for effecting fine adjustments in focusing.

One of the objects of my invention is to provide an improved fine adjustment mechanism for microscopes. Another object is to provide a microscope having a fine adjustment mechanism which can be actuated with the hand of the operator resting on the table. A further object is to provide a microscope having a tiltable arm and a fine adjustment actuating device which is substantially coaxial with the tilting axis. These and other objects and advantages reside in certain novel features of construction, arrangement and combination of parts as will hereinafter be more fully described.

Referring to the drawing.

Figure 1:
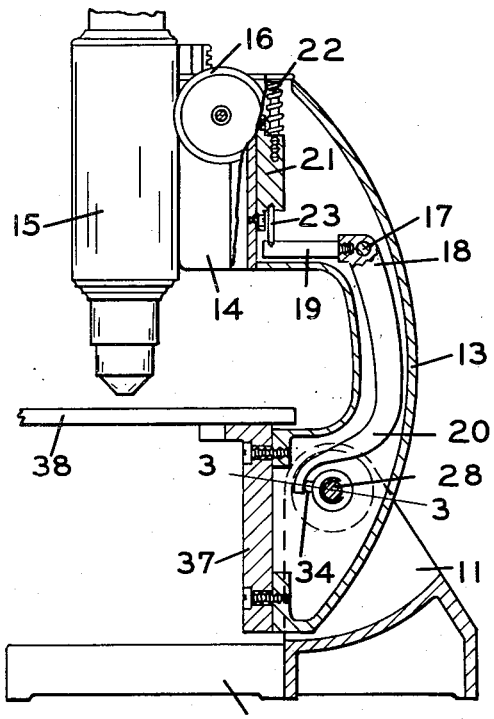
Fig. 1 is a side view, with parts in section, of a microscope embodying my invention.
Figure 2:
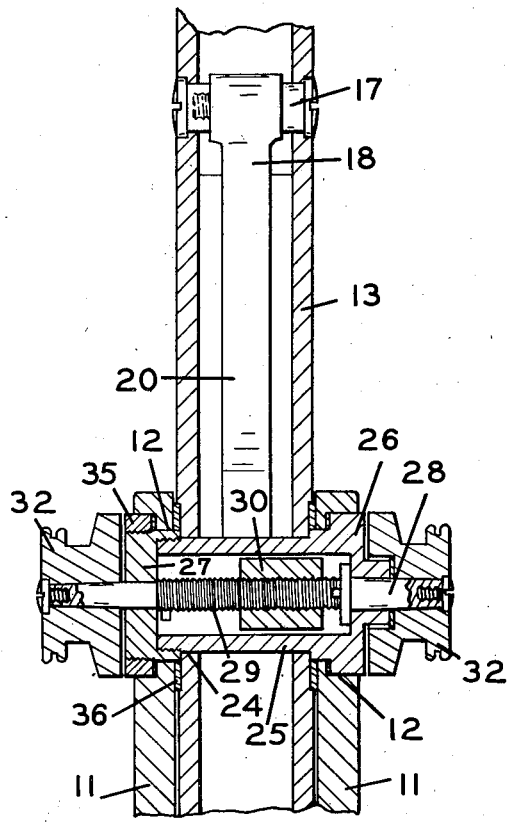
Fig. 2 is an enlarged fragmentary sectional view of same.
Figure 4:
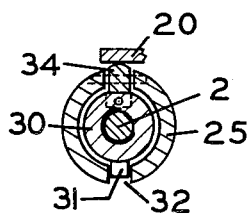
Fig. 4 is a sectional view on line 4—4 of Fig. 3.
Figure 5:
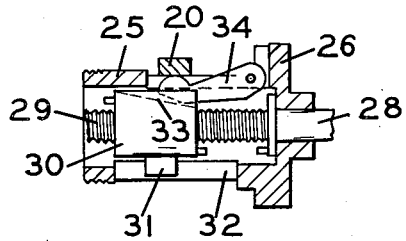
Fig. 5 shows the screw actuated cam.
Figure 3:
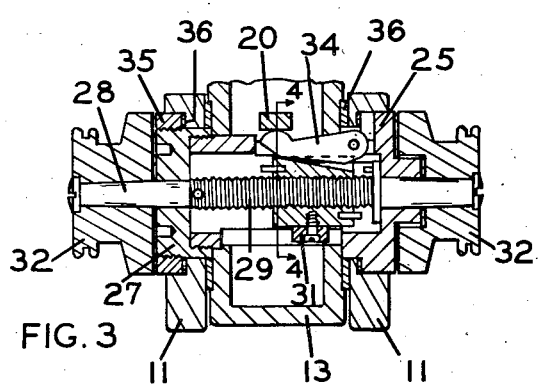
Fig. 3 is an enlarged sectional view on line 3—3 of Fig. 1.

A preferred embodiment of my invention is illustrated in the drawing wherein 10 indicates a base having two spaced projections 11 each having an opening 12 providing a bearing portion. Mounted on the projections 11 is the bracket arm 13 at the top of which is slidably mounted a block 14 carrying the lens tube 15 on which are carried the usual eye piece and objective. Coarse adjustment of the lens tube is provided by the usual rack and pinion arrangement 16. Pivotally mounted at 17 within the hollow bracket arm 13 is the bell crank lever 18 having a short arm 19 and a downwardly extending curved arm 20. The block 14 has a projection 21, on the top of which is mounted the coil spring 22 which normally urges the block downwardly so that the thrust pin 23 is held against arm 19.

The lower part of bracket arm 13 is provided with an opening 24 within which is mounted a substantially tubular bushing member 25 having an enlarged head portion 26 at one end thereof. A threaded cap 27 is screwed tightly onto the other end of the bushing member so that bushing member 25 is thereby firmly secured to bracket arm 13. Rotatably mounted on the bushing member 25 is the shaft 28 having a threaded portion 29 on which is mounted a threaded nut 30 carrying a member 31 which projects into a slot 32 formed in the under side of the bushing 25. Fixedly secured to the two tapered ends of shaft 28 are the two knobs 32 which are adapted to be engaged by the hand of the operator. On the top of nut 30 is a groove having an inclined cam surface 33 which is engaged by a lever 34 pivotally mounted on the bushing member 25. Since the coil spring 22 urges the thrust pin 23 down against arm 19, the lower end of the curved arm 20 of the bell crank lever 18 is held in contact with the pivoted lever 34.

In operation, a fine adjustment is effected by turning knob 32 thereby imparting rotation to the shaft 28 and causing the nut 30 to move horizontally since it is held against rotation by means of the member 31 which cooperates with slot 32. As the nut 30 moves back and forth the pivoted lever 34 moves in and out and so transmits motion to the bell crank lever 18 and thence to slide 14. Since the coil spring 20 normally urges the slide downwardly, the parts of the system are firmly held under tension and smooth, delicate adjustments can be effected without back-lash and lost motion.

Since the bracket arm 13 is fixedly secured to bushing member 25, the two turn together as a unit with the head portion 25 and cap 27 turning in the bearing portions provided by openings 12 in the projections 11. Hence the axis of shaft 28 is substantially coincident with the axis of bushing member 25. In order to vary the frictional engagement between the bushing member 25 and projections 11, a nut 35 is threaded onto the cap 27. Washers 36 of fibre or other suitable material are positioned between the bracket arm 13 and the bearing portions and between the bushing member and the bearing portions. Attached to the lower part of bracket arm 13 is a plate 37 carrying the usual stage 38 for holding the objects to be examined.

From the foregoing, it will be apparent that I am able to attain the objects of my invention and provide a microscope having a fine adjustment mechanism which can be operated with the hand resting on the table, thereby affording great convenience for research workers. The bracket arm can be tilted to an inclined position, if desired, but such tilting takes place about an axis which is substantially coincident with the axis of the fine adjustment actuating device so that the fine adjustment knobs are always at the same distance from the table irrespective of the position of the bracket arm. My improved mechanism can be manufactured and assembled readily and although relatively rugged in structure it is sensitive and smooth in operation. Various modifications can obviously be made without departing from the spirit of my invention.

I claim:

1. In a microscope, the combination of a base, a bracket arm mounted on said base, a lens tube movably mounted at the top of said arm and means for moving said tube, said means comprising a lever pivotally mounted to turn on the upper part of said arm, a pivotally mounted member at the lower part of said arm, said member being in contact with said lever and cam means for moving said member.

2. In a microscope, the combination of a base, a bracket arm mounted on said base, a lens tube movably mounted at the top of said arm and means for moving said tube, said means comprising a lever pivotally mounted on the upper part of said arm, said lever having a portion terminating at the lower part of said arm, a pivoted member contacting said portion, cam means operatively connected to said member, and rotatable screw means for moving said cam means.

3. In a microscope the combination of a base having a bearing portion, an arm, a bushing member on said arm, said member being mounted to turn on said bearing portion, a lens tube movably mounted on said arm and means for moving said lens tube, said means comprising an element which is rotatably mounted on said bushing member.

4. In a microscope the combination of a base having two spaced bearing portions, a bushing member rotatably mounted on said bearing portions, an arm fixedly mounted on said bushing member and adapted to turn therewith, a lens tube movably mounted on said arm and means for moving said lens tube, said means comprising screw actuated cam means mounted on said bushing member.

5. In a microscope the combination of a base having two spaced bearing portions, an arm having a bushing member fixedly secured thereto and extending outwardly on each side thereof, said bushing member being mounted to turn in said bearing portions, means for varying the frictional engagement between said bushing member and bearing portions, a lens tube movably mounted on said arm, means for moving said arm, said means comprising actuating mechanism carried by said bushing member.

6. In a microscope the combination of a base having spaced bearing portions, a substantially tubular bushing member rotatably mounted on said bearing portions, an arm fixedly secured to said bushing member and adapted to turn therewith, a lens tube movably mounted on said arm and means for moving said tube, said means comprising a lever pivotally mounted on said arm, cam means on said bushing member, said cam means being operatively engaged with said lever and a rotatably mounted screw within said bushing member for actuating said cam means.

7. In a microscope, the combination of a base having two spaced projections, an arm having a member providing two journal portions which are mounted to turn in said projections, a lens tube slidably mounted at the top of said arm, a bell crank lever pivotally mounted on said arm, one part of said lever being connected to said lens tube, a screw rotatably mounted on said member, a threaded nut adapted to be moved by said screw, a cam surface on said nut and means operatively connecting the other part of said lever to said cam surface.

8. In a microscope the combination of an arm, a lens tube slidably mounted on said arm, a bell crank lever pivotally mounted on said arm, means connecting said lever and tube, a screw rotatably mounted on said arm, a threaded nut mounted on said screw and adapted to be moved thereby, said nut having an inclined cam surface, and a pivotally mounted member engaging said cam surface and said bell crank lever.

9. In a microscope, the combination of a base, an arm mounted on said base, a lens tube movably mounted on said arm and means for moving said tube, said means comprising a bell crank lever pivotally mounted on said arm, said lever having a downwardly extending portion, a member pivotally mounted at the lower part of said arm, said member being in contact with the downwardly extending portion of said arm, cam means for moving said member and rotatable screw means for moving said cam.

10. In a microscope, the combination of a base, an arm mounted to tilt about an axis on said base, a lens tube movably mounted on said arm and means for moving said tube, said means comprising a lever pivotally mounted on said arm, cam means operatively engaging said lever and a rotatable screw for moving said cam means, the axis of said screw being substantially coincident with the axis about which said arm tilts.

GEORGE B. GALLASCH.